United States Patent
Liao et al.

(10) Patent No.: US 8,125,449 B2
(45) Date of Patent: Feb. 28, 2012

(54) MOVABLE TOUCHPAD WITH HIGH SENSITIVITY

(75) Inventors: Chih-Ming Liao, Taoyuan (TW);
Ting-Wei Chiang, Banciao (TW);
Chun-Hao Chen, Tucheng (TW);
Yi-Yuh Hwang, Taoyuan (TW); Shin-I Ma, Longtan Township, Taoyuan County (TW); Wen-Cheng Huang, Taipei (TW);
Chin-Der Hwang, Jhubei (TW);
Mau-Ran Wang, Taipei (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 314 days.

(21) Appl. No.: 12/639,110

(22) Filed: Dec. 16, 2009

(65) Prior Publication Data
US 2011/0141014 A1    Jun. 16, 2011

(51) Int. Cl.
*G06F 3/033*    (2006.01)
*G09G 5/08*    (2006.01)

(52) U.S. Cl. ...................................... 345/158

(58) Field of Classification Search ................... 345/158,
345/156, 166, 173, 174, 175; 280/735; 250/221
See application file for complete search history.

(56) References Cited

U.S. PATENT DOCUMENTS

| | | | |
|---|---|---|---|
| 5,424,756 A * | 6/1995 | Ho et al. | 345/158 |
| 6,820,897 B2 * | 11/2004 | Breed et al. | 280/735 |
| 6,950,094 B2 * | 9/2005 | Gordon et al. | 345/166 |
| 7,161,136 B1 * | 1/2007 | Wenstrand et al. | 250/221 |
| 7,643,007 B2 * | 1/2010 | Gordon et al. | 345/166 |
| 7,728,821 B2 * | 6/2010 | Hillis et al. | 345/173 |
| 7,791,590 B1 * | 9/2010 | Gordon et al. | 345/166 |
| 7,808,485 B2 * | 10/2010 | Gordon et al. | 345/166 |
| 7,907,120 B2 * | 3/2011 | Gordon et al. | 345/166 |
| 8,021,356 B2 * | 9/2011 | Uchiyama et al. | 604/890.1 |
| 8,068,096 B2 * | 11/2011 | Taira et al. | 345/158 |
| 2008/0068332 A1 * | 3/2008 | Chan et al. | 345/156 |
| 2010/0066672 A1 * | 3/2010 | Schoolcraft et al. | 345/158 |

* cited by examiner

*Primary Examiner* — Fred Tzeng
(74) *Attorney, Agent, or Firm* — Bacon & Thomas, PLLC

(57) ABSTRACT

A highly sensitive movable touchpad is disclosed in the present invention. It is used for laptop computers and has a slidable template for users to move so that a cursor can be controlled by the touchpad. A resistive or capacitive detecting surface can be applied for detecting users' click, double click, drag, or scroll motion on any point of the surface. Additionally, there is an optical displacement sensor provided under the slidable template for detecting surface information on the back surface of the slidable template. A sequence of images of surface movement are processed by an image processing unit. Then, relative movement information is calculated and sent to an operating system in the computer. The operating system controls the cursor with the relative movement information. The present invention uses edge detectors for dynamically controlling the cursor and calibrating location of the cursor so that positioning of the touchpad is synchronous with the cursor.

20 Claims, 7 Drawing Sheets

MOVABLE TOUCHPAD WITH HIGH SENSITIVITY

FIELD OF THE INVENTION

The present invention relates to a movable touchpad. More specially, the present invention relates to a movable touchpad for a laptop computer.

BACKGROUND OF THE INVENTION

For convenience of portability, a laptop computer usually has a touchpad near a keyboard to replace a mouse as an input device. Users are not limited to the environment where they use the laptop computer and free from inconvenience that the mouse has to be carried all the way. However, touchpads have defects such as low sensitivity and easy affection by environment. Most users would like to use a mouse rather than a touchpad.

A touchpad generally comprises two portions: a touch detecting unit and a touch control unit. The touch detecting unit is used for detecting and receiving touch control location data from users. Then, the touch control location data is sent to the touch control unit. By the touch control unit, the location data is converted into a coordinate. The coordinate is sent to an operating system (OS) of a computer to control location of a cursor. A common touchpad utilizes resistance, capacitance, infrared ray, or surface acoustic wave.

However, characteristics of the touchpad are easily influenced by change of the atmospheric pressure to affect operation sensitivity. For example, when the atmospheric pressure becomes lower, human body will lower its internal pressure to adapt to the change of the atmospheric pressure. It causes change of conductivity in the human body. When a capacitive touchpad is used, due to reduction of coupled capacitance formed between the human body and the touchpad, sensitivity of the touchpad decreases accordingly. Hence, users need to exert larger force. On the other hand, when the atmospheric pressure becomes higher, users merely need to exert smaller force.

As to a resistive touchpad, the principle thereof is pressure detection on the surface of the touchpad. After voltage transformation, the touch location can be calculated. When the atmospheric pressure becomes lower, users need to exert larger force. When the atmospheric pressure becomes higher, users merely need to exert smaller force.

Therefore, under different atmospheric pressures, operating sensitivity of the touchpad will be affected. It is inconvenient for users to change their habit and force in using the touchpad.

Touchpads have lower sensitivity in moving. When the sensitivity is increased, precise positioning can not be achieved. Sensitivity and positioning precision will be affected by user contact area. Additionally, when a current touchpad is used to move the cursor, fingers are needed to draw back and forth on the touchpad to move the cursor. When the cursor needs to be moved a longer distance, it is inconvenient for the fingers to draw back and forth many times.

Since traditional touchpads are easily influenced by the change of the environmental atmospheric pressure or sweats from the fingers to affect operation sensitivity and positioning precision, it is necessary to provide a touch control device having sensitivity irrespective of change of the environmental atmospheric pressure. Meanwhile, it can provide better control over sensitivity so that a laptop computer can control the cursor with high sensitivity without the aid of a mouse.

Therefore, in order to solve problems mentioned above, US Patent Publication No. 2008/0068332 provides a new touchpad device to control the cursor on the screen. Please refer to FIG. 1. The invention uses a light source to scan a moving template and reflected light beams from the moving template to calculate movement and location of the cursor corresponding to displacement of the moving template. In addition, there is an automatic homing device for fixing the moving template in a certain point so that the template can be further used to control the cursor. However, the automatic homing device in this invention doesn't conform to usual practice. There is no detailed study on relation between cursor displacement speed and edge contacting time of the touchpad. It causes new problems and becomes more inconvenient.

SUMMARY OF THE INVENTION

In order to solve the problems and inconvenience in the prior art mentioned above, the present invention provides a movable touchpad for a computer. It has a slidable template for users to touch and move. It can also provide users with feeling of movement to control location of the cursor of the computer. There is a resistive or capacitive surface above the slidable template for providing users with click, double click or drag function on any location of the surface. Additionally, an optical detecting device is provided below the slidable template for detecting displacement optical speckle images of the back surface of the slidable template. The optical speckle images are continuously processed by an image processor. Relative displacement data are calculated and sent to the operating system of the computer for the operating system to control location of the cursor. Furthermore, the present invention also uses a edge detecting device. The edge detecting device not only provides a dynamic control over the cursor, but also calibrates the location of the cursor to synchronize the movement of the slidable template and the corresponding movement of the cursor.

By replacing a conventional capacitive or resistive touchpad with a slidable template to control movement of a cursor, it can avoid adverse influence on moving the touchpad caused by change of atmospheric pressure. Besides, an optical mechanism using invariant optical speckle imaging device and method with a slidable template has higher sensitivity and linearity. Thus, it doesn't need to move fingers back and forth frequently on the touchpad for achieving a long movement of a cursor. It can reduce fatigue of fingers. Accordingly, prevention of wrist injury caused by long time use of a mouse and finger injury caused by long time use of a traditional touchpad can be achieved by the present invention. Furthermore, a slidable template can provide users with good feeling like using a mouse.

In accordance with an aspect of the present invention, a highly sensitive movable touchpad for a digital apparatus having a cursor, includes: a slidable template having a front surface exposed and a back surface with a specific texture; a limiting member, for limiting the slidable template within a moving range and providing the slidable template with a low friction, surrounding the slidable template and exposing central portion of the front surface of the slidable template; an optical displacement detecting device, located below the slidable template, for detecting movement of the slidable template, including: a light source, for emitting light beams to illuminate the back surface of the slidable template; an image sensor for receiving speckle images formed by light beams scattered by the back surface; and an image processor for obtaining relative location, moving direction and speed of the slidable template by comparison of the speckle images; and a control unit for controlling corresponding movement of the cursor of the digital apparatus according to the relative location, moving direction and speed obtained from the image processor.

Preferably, the limiting member has an opening around central portion of the back surface of the slidable template for exposing the back surface to be illuminated by the light beams from the light source.

Preferably, the optical displacement detecting device further includes a lens for converting the light beams emitted from the light source into parallel light beams to illuminate the back surface of the slidable template.

Preferably, the optical displacement detecting device further includes an imaging module for receiving the scattered light beams and generating diffractive light beams.

Preferably, the imaging module includes an imaging lens and an aperture.

Preferably, the movable touchpad further includes a capacitive touch switch located on the slidable template for providing the slidable template with touch functions.

Preferably, the touch functions include single click, double click, drag and scroll.

Preferably, the movable touchpad further includes a resistive touch switch located on the slidable template for providing the slidable template with touch functions.

Preferably, the touch functions include single click, double click, drag and scroll.

Preferably, the front and back surfaces of the slidable template are form of an identical material.

Preferably, the front and back surfaces of the slidable template are form of different rigid materials.

Preferably, the slidable template is made of aluminum.

Preferably, the front and back surfaces of the slidable template have different surface characteristics.

Preferably, the surface characteristics include roughness and texture.

Preferably, the movable touchpad further includes a edge detecting device, provided at four sides of the limiting member, for detecting whether the slidable template reaches limit of the moving range.

Preferably, the edge detecting device includes a miniaturized touch switch, sensor or button switch.

Preferably, the edge detecting device provides a edge contact signal to the image processor for synchronizing the movement of the slidable template and the corresponding movement of the cursor.

Preferably, the edge contact signal is a digital pulse.

Preferably, the light source is a light emitting diode (LED) or laser diode (LD).

Preferably, the image processor is a central processing unit (CPU), field programmable gate array (FPGA), digital signal processor (DSP) or application-specific integrated circuit (ASIC).

DETAILED DESCRIPTION OF THE PREFERRED EMBODIMENTS

The goal of the present invention is to provide a highly sensitive movable touchpad. It can provide control over cursor with good sensitivity and touch control functions. The movable touchpad can be applied to laptop computers. It can also be applied to joysticks, remote controls and any interfaces using a cursor for browsing.

The present invention is illustrated in detailed by three embodiments.

First Embodiment

Figure 1:
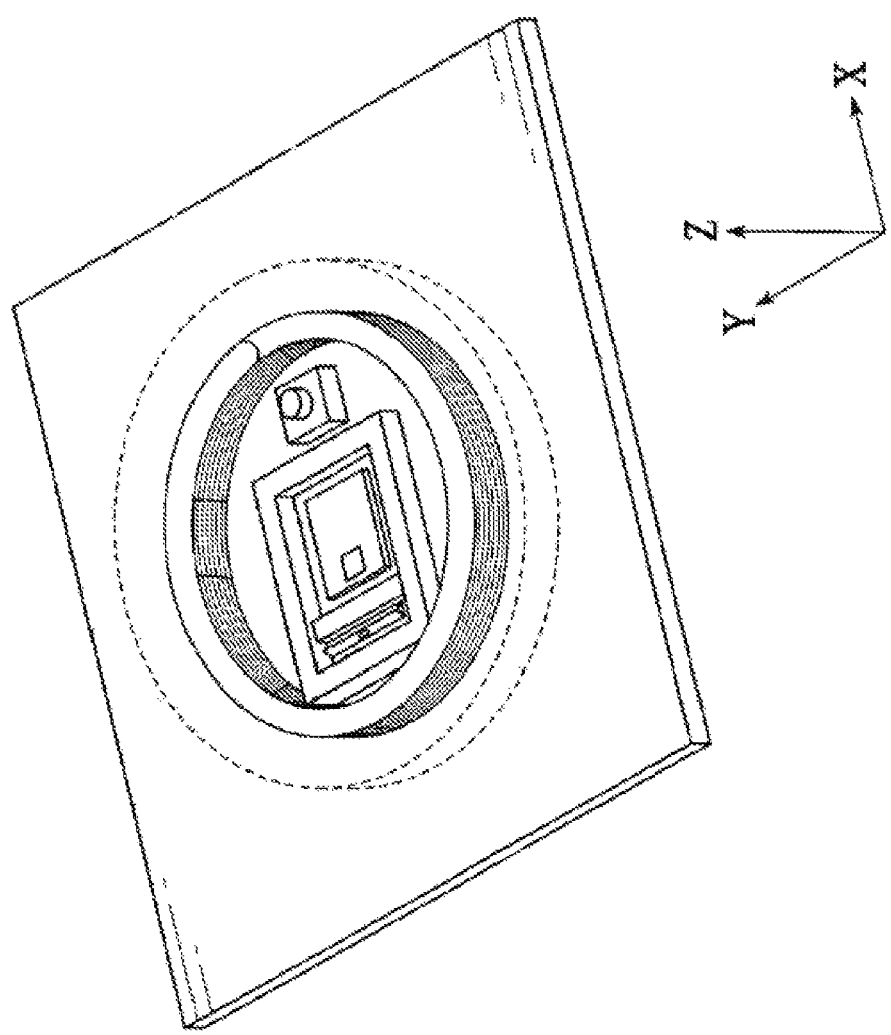
FIG. 1 illustrates a prior art of a touch control device.
Figure 2:
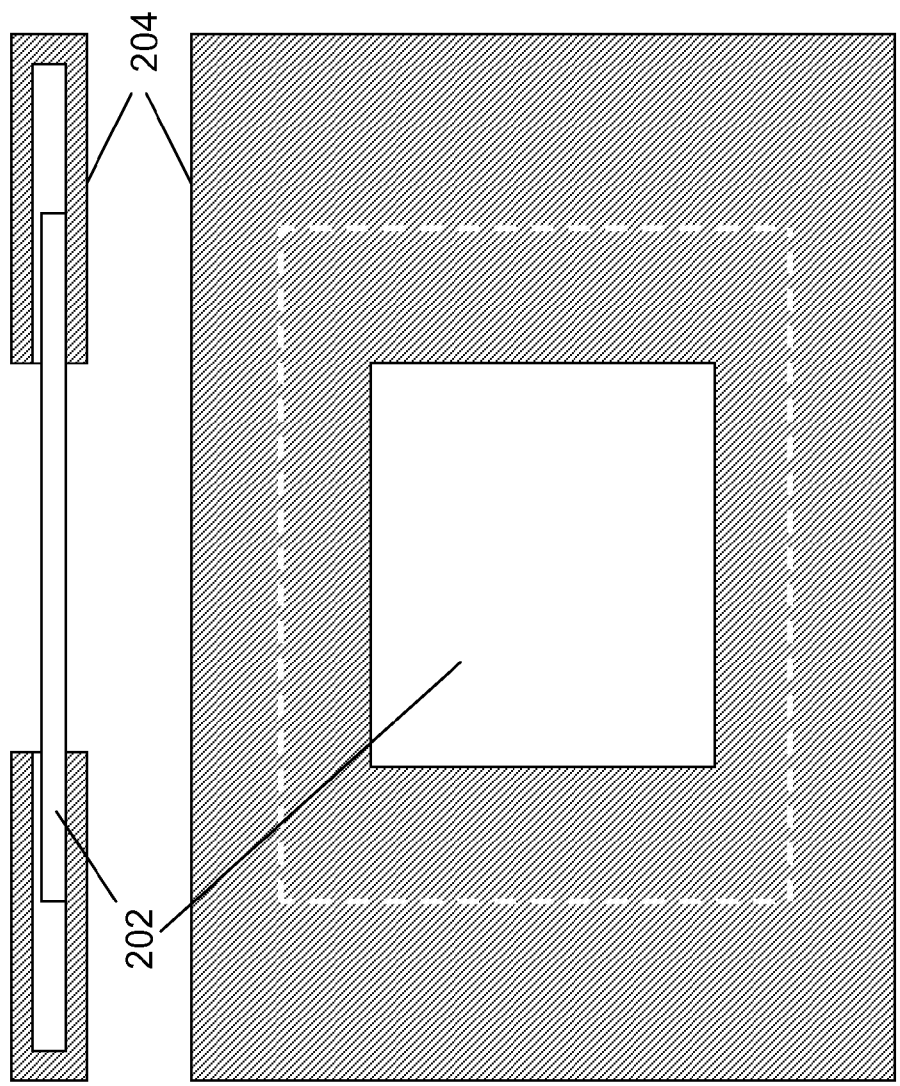
FIG. 2 illustrates a touchpad of the present invention.
Figure 3:
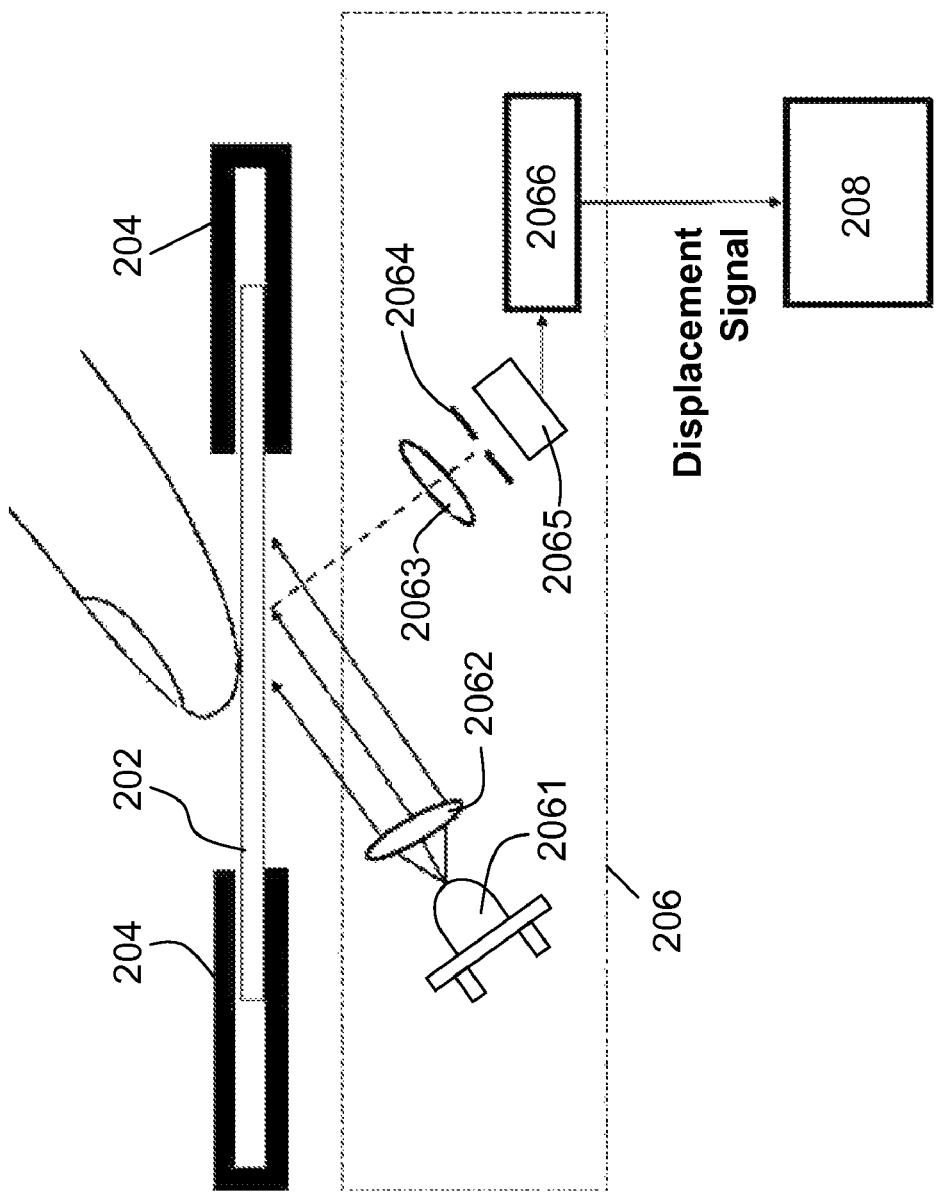
FIG. 3 illustrates a first embodiment of the present invention.

As shown in FIG. 2 and FIG. 3, a movable touchpad comprises a slidable template 202 and a housing 204. The slidable template 202 is provided in the housing 204. The housing 204 has an upper opening on the top surface and a lower opening on the bottom surface. The upper opening is for fingers to touch. The slidable template 202 is movable and exposed externally via the upper opening of the housing 204 for users to use fingers to control movement. Please refer to FIG. 2. FIG. 2 shows a longitudinal sectional view of the housing 204 and slidable template 202 (with central portion of the housing 204 omitted for easy understanding) in the upper portion of the figure and a top view thereof in the lower portion of the figure. The housing 204 has a space for accommodating the slidable template 202. A main function of the housing 204 is to provide the slidable template 202 with a low sliding friction and limit moving range of the slidable template 202. The moving range has the same aspect ratio as that of the screen. Hence, when the slidable template 202 moves in the limited moving range, the cursor can be moved to any point of the screen.

As shown in FIG. 3, an optical displacement detecting device 206 is installed below the slidable template 202 for detecting displacement of the slidable template 202. At the lower opening of the housing 204, a light source 2061 (LED or LD) of the optical displacement detecting device 206 can be used to illuminate the back surface of the slidable template 202.

The front surface of the slidable template 202 is formed with a material which provides users' fingers with comfortable touching feeling. The back surface of the slidable template 202 is advantageous to the optical displacement detecting device 206 for detecting displacement. For example, for a LED light source, the back surface is rough so as to be convenient for displacement calculation. However, for a laser light source, the back surface is well scattering so as to catch good contrast optical speckle images for calculating optical speckles displacement. Therefore, the slidable template 202 can be made of a single rigid material (for example, aluminum), composed rigid materials (front and back surfaces of the slidable template 202 having different materials), or any two materials having different surface characteristics (such as roughness and texture) in the front and back surfaces of the slidable template 202, to satisfy the requirements that the front surface needs good feeling and the back surface needs to perform optical displacement detection.

Another function of the slidable template 202 is to prevent light beams from the light source 2061 from hurting human eyes.

In addition to the light source 2061, the optical displacement detecting device 206 comprises a lens 2062, an imaging lens 2063, an aperture 2064, an image sensor 2065 and an image processor 2066. The imaging lens 2063, aperture 2064 and image sensor 2065 form an optical detecting mechanism. The lens 2062 converts light beams from the light source 2061 into parallel light beams and send the parallel light beams to the back surface of the slidable template 202, and scattered light beams are generated. The imaging module composed of the imaging lens 2063 and aperture 2064 is used to receive scattered light beams and generate several diffractive light beams. After the light beams emitted from the light source 2061 are illuminated to the back surface of the slidable template 202 via the lens 2062, the imaging lens 2063 and aperture 2064 will form shadows and optical speckles of the back surface of the slidable template 202 onto the image sensor 2065 for converting the received optical speckles into imaging signals. Later, the imaging signals representing continuous movement of the optical speckles are sent to the image processor 2066 to obtain a displacement signal of the slidable template 202. The displacement signal is sent to a driver of a computer 208 for providing location control to the cursor. The image processor 2066 is in charge of imaging processing and displacement calculation. It generates location data with respect to the slidable template 202 according to the received optical speckles. Relative location, moving direction and speed of the slidable template 202 can be obtained according to the location data. The image processor 2066 is a central processing unit (CPU), field programmable gate array (FPGA), digital signal processor (DSP) or application-specific integrated circuit (ASIC).

Second Embodiment

Figure 4:
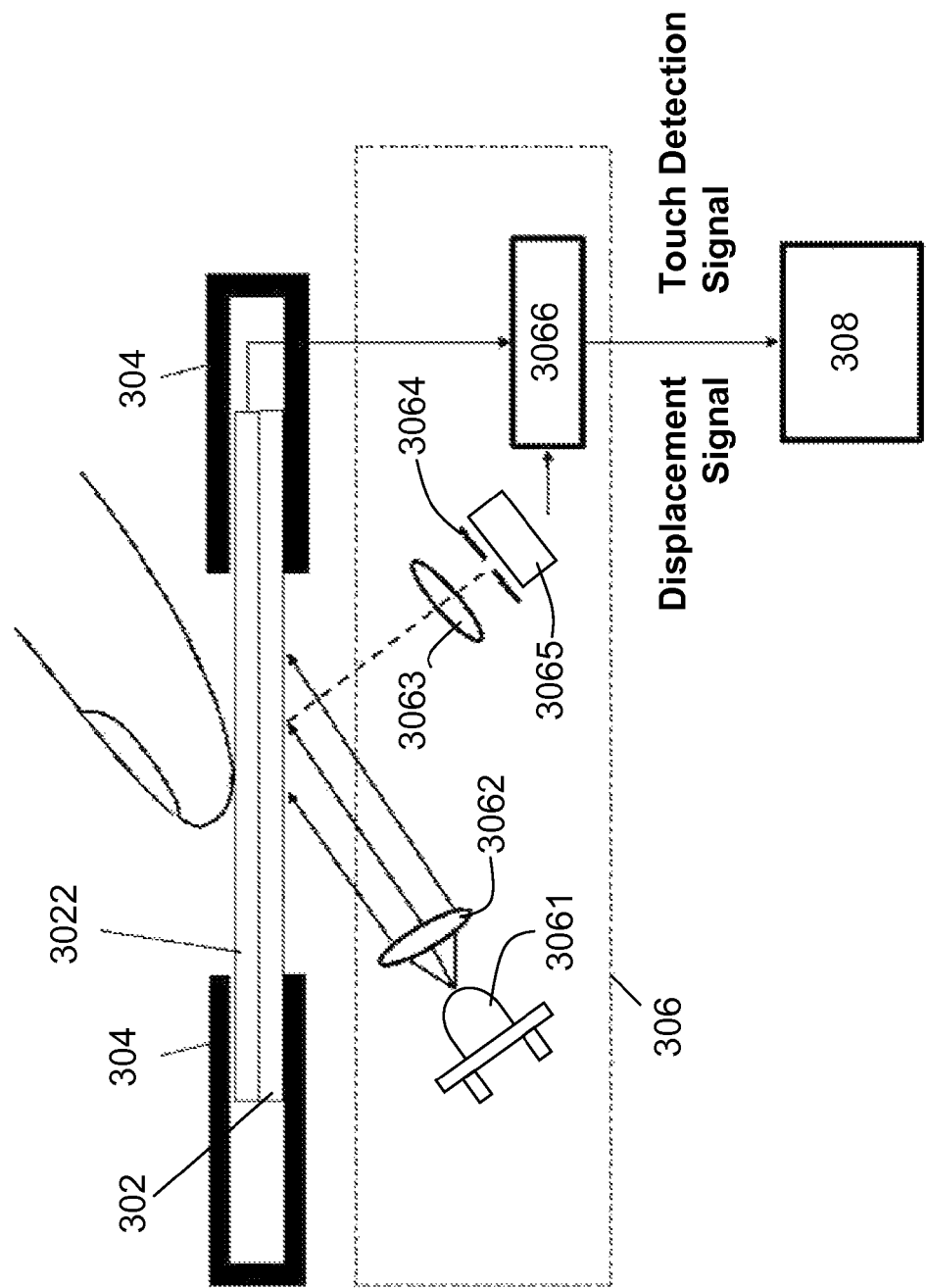
FIG. 4 illustrates a second embodiment of the present invention.

As shown in FIG. 4, most elements and their functions of the present embodiment are the same as those in FIG. 3. A movable touchpad of the second embodiment has a slidable template 302, a housing 304, and an optical displacement detecting device 306 (including a light source 3061, a lens 3062, an imaging lens 3063, an aperture 3064, an image sensor 3065 and an image processor 3066). Members having like functions will be identified by like reference numerals and overlapping descriptions will be omitted. In this embodiment, the slidable template 302 is a combination of different rigid materials. The back surface of the slidable template 302 is used as an optical blocker and a detected surface for the optical displacement detecting device 306.

The front surface of the slidable template 302 is provided with a capacitive or resistive touch switch 3022. When an object, such as a finger, touches the touch switch 3022, a touch detection signal will be sent to the image processor 3066 of the optical displacement detecting device 306. In addition to image processing and displacement calculation, the image processor 3066 performs detection of touch detection signal and determination of the kind of cursor functions, such as single click, double click, drag or scroll. Then, the image processor 3066 sends the detected displacement signal as mentioned in the first embodiment and touch detection signal to a driver of a computer 308 to provide cursor location control and cursor functions.

Third Embodiment

A slidable template is equally partitioned into several regions which are mapped correspondingly to various portions of the screen. Users control displacement and direction of movement of the slidable template to map the movement of the slidable template to the movement of the cursor on the screen. Since the slidable template is confined in a limited moving range, in order to have a better dynamic control for the cursor, such as gaming control, a edge detecting device is incorporated.

The edge detecting device can be a miniaturized touch switch, sensor, button switch or I/O contacts. It provides a edge contact signal which can be a digital pulse. The edge detecting device detects contact time of the slidable template and the edge detecting device.

Figure 5:
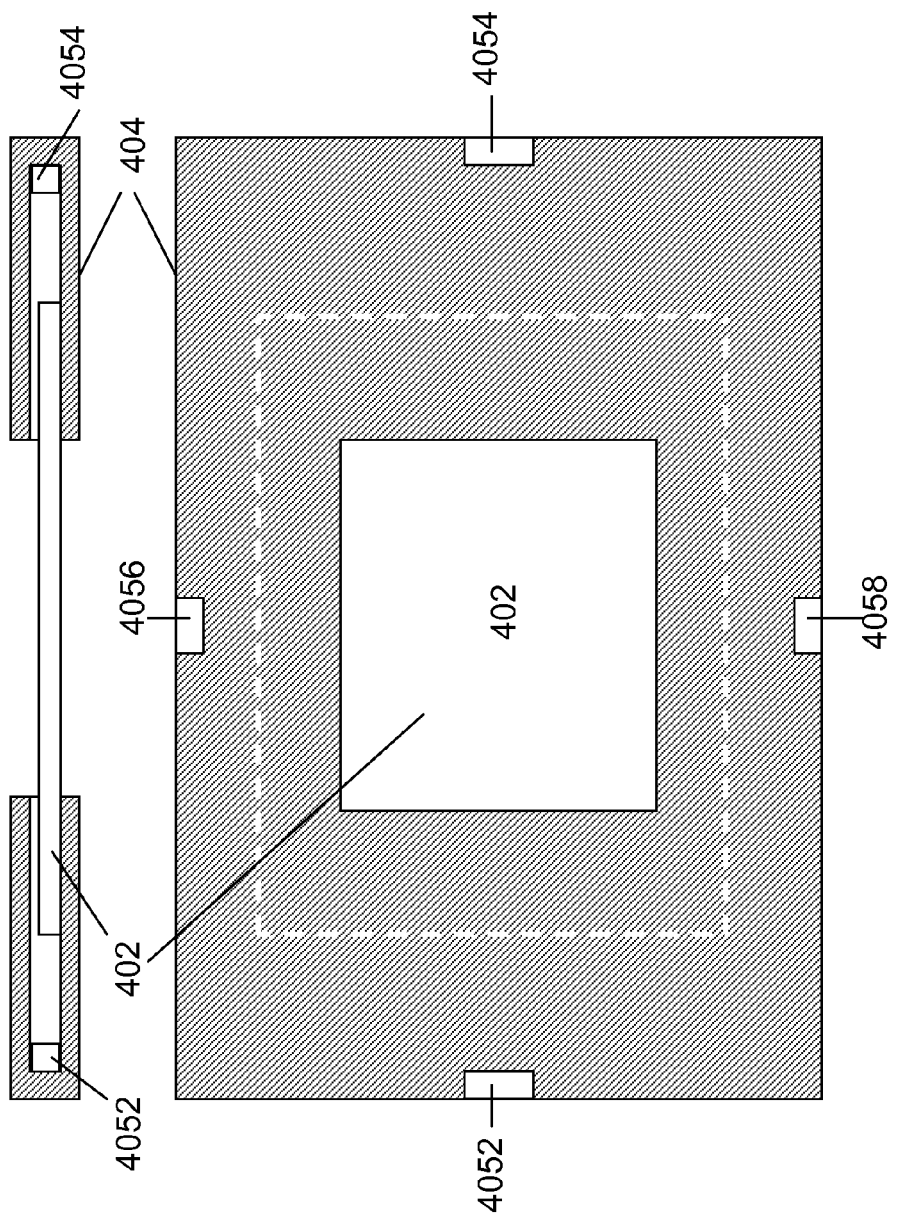
FIG. 5 illustrates another touchpad of the present invention.
Figure 6:
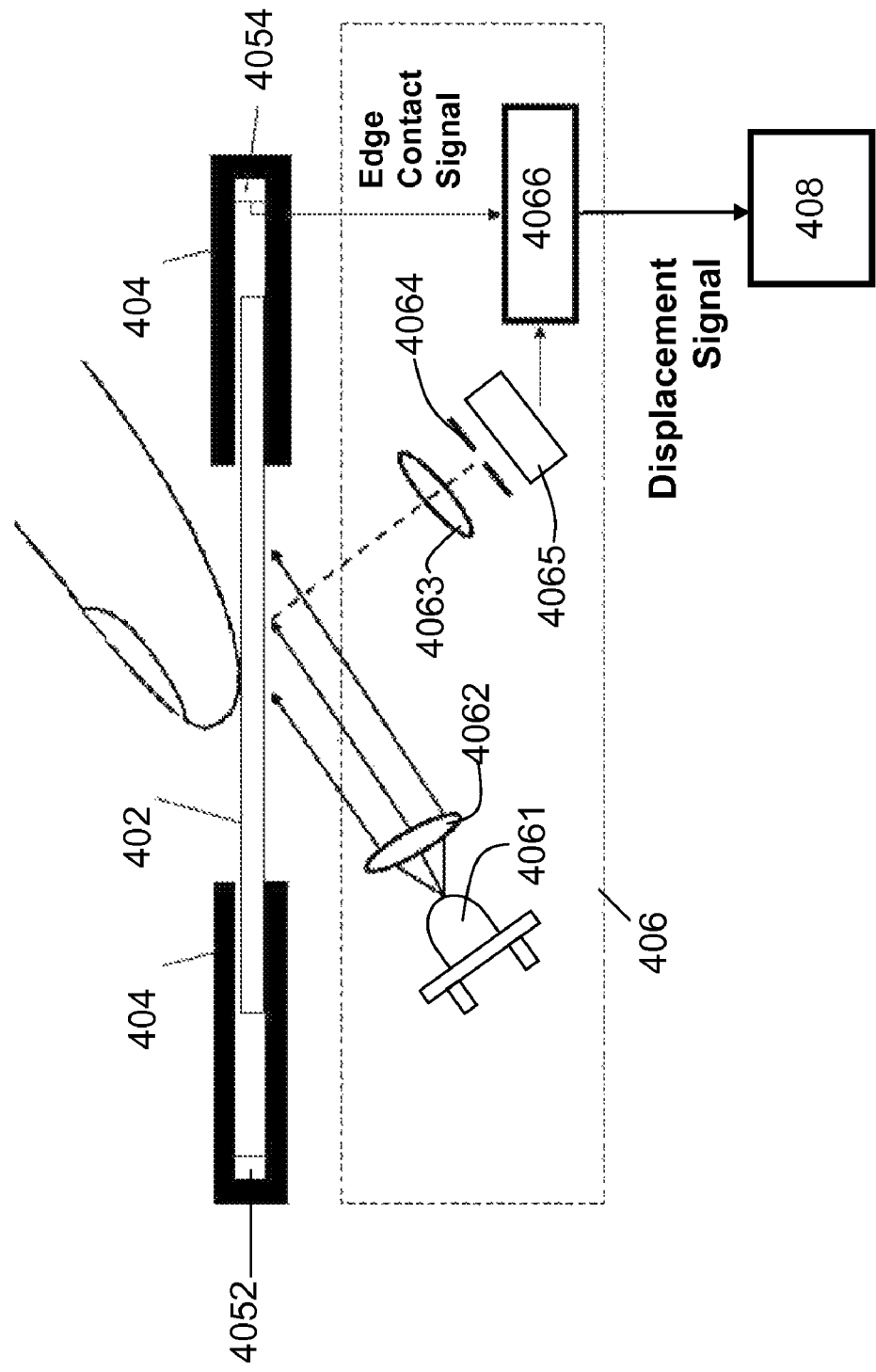
FIG. 6 illustrates a third embodiment of the present invention.

Please refer to FIG. 5 and FIG. 6. A left edge detecting device 4052, a right edge detecting device 4054, a top edge detecting device 4056 and a bottom edge detecting device 4058 are installed at the left, right, top and bottom sides (seen from the top view) inside a housing 404. The edge detecting devices are to detect whether a slidable template 402 contacts edges of the moving range or not. When the slidable template 402 contacts the edges, an image processor 4066 of an optical displacement detecting device 406 will receive a edge contact signal. The optical displacement detecting device 406 includes a light source 4061, a lens 4062, an imaging lens 4063, an aperture 4064, the image sensor 4065 and the image processor 4066. Members having like functions are identified by like reference numerals and overlapping descriptions will be omitted. The edge contact signal is a digital pulse. The slidable template 402 holds stationary after it contacts the edge detecting device. While the slidable template 402 is stationary, the image processor 4066 will keep receiving the digital pulses to determine stationary status and contact time of the slidable template 402. Now, in order to ensure that the cursor moves in synchronization with the slidable template 402 to the edge of the screen, the image processor 4066 reports an predicted moving speed of the cursor to a computer 408 to cause the cursor to contact the edge of the screen while the slidable template 402 is stationary.

Figure 7:
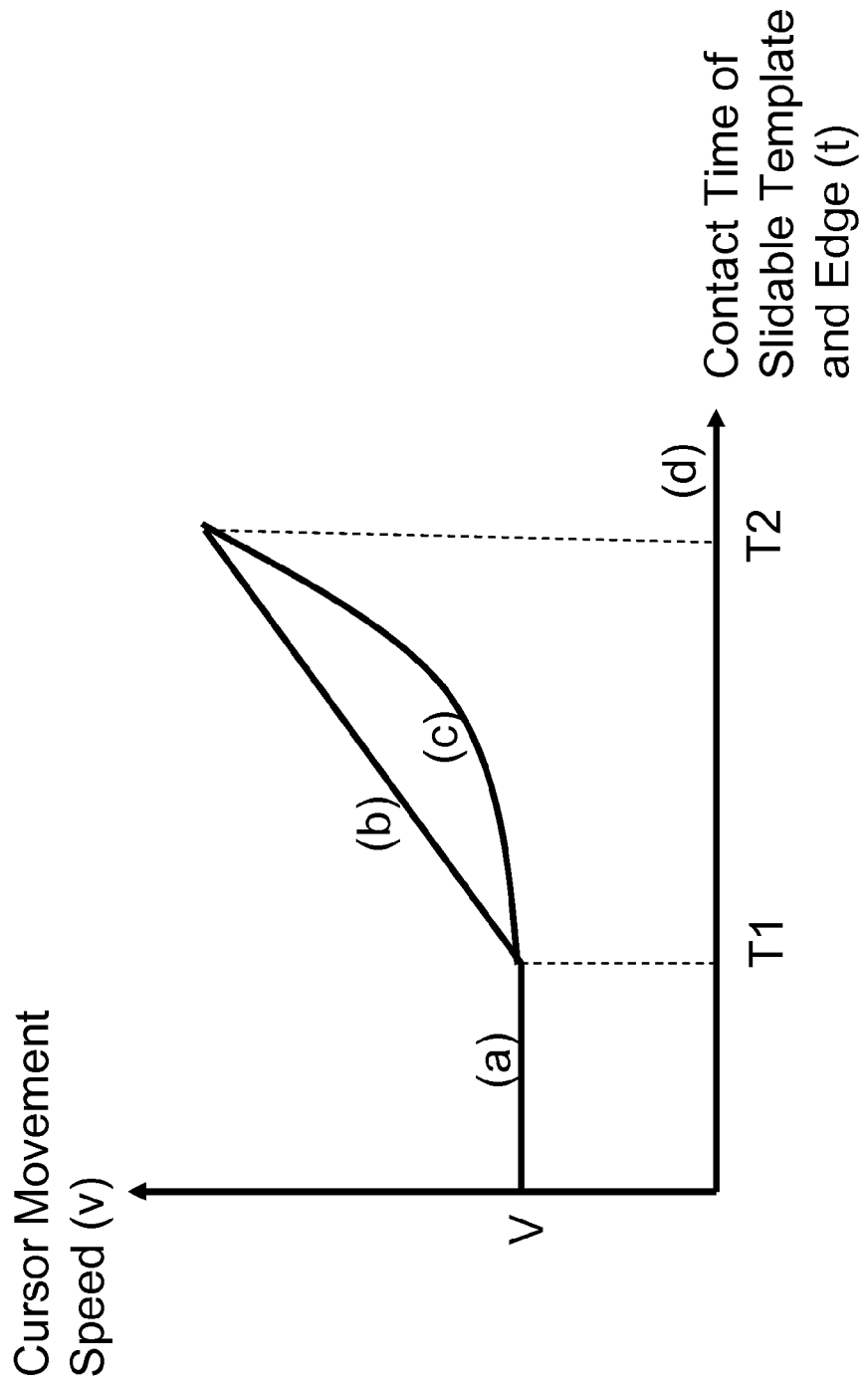
FIG. 7 shows a relationship between cursor movement speed and contact time of the touchpad and the edge in the present invention.

As shown in FIG. 7, the abscissa represents contact time (t) of the slidable template 402 and the edge and the ordinate represents movement speed (v) of the cursor. Time t is set to zero while the slidable template 402 first contacts the edge detecting device. Segment (a) represents a situation where $0 \leq t \leq T1$ and the computer 408 controls the cursor to move to the edge at a constant speed V. Segment (b) represents a situation where $T1 \leq t \leq T2$ and moving speed of the cursor will increase linearly. It can also increase exponentially as Segment (c). When $t \geq T2$, the speed drops to zero as Segment (d). Before the cursor arrives at the screen edge, location of the cursor is calculated by the image processor 4066 and the image processor 4066 sends out predicted displacement data. After the cursor arrives at the screen edge, the speed drops to zero and the cursor stops moving. Values of time T1, time T2, speed V, slope of Segment (b) and curvature of the Segment (c) can be set by a configuration program of the computer 408, and sent to the image processor 4066.

Furthermore, users can also decide to adopt Segment (a), (b) or (c). For example, when T1=0 and T2≠0, Segment (a) is not applicable, and only Segment (b) or (c) is workable. When T1≠0 and T1=T2, only Segment (a) is workable. When T1=T2=0, the cursor arrives at the screen edge if the slidable template contacts the edge, and no movement of the cursor can be seen.

The edge detecting devices can provide not only dynamic control over the cursor, but also adjustment for the location of the cursor to synchronize movement of the slidable template with that of the cursor on the screen.

The present invention is not limited to the embodiments above. For example, the moveable touchpad of the second embodiment can be integrated with that of the third embodiment.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A highly sensitive movable touchpad for a digital apparatus having a cursor, comprising:
   a slidable template having a front surface exposed and a back surface with a specific texture;
   a limiting member, for limiting the slidable template within a moving range and providing the slidable template with a low friction, surrounding the slidable template and exposing central portion of the front surface of the slidable template;
   an optical displacement detecting device, located below the slidable template, for detecting movement of the slidable template, including:
      a light source, for emitting light beams to illuminate the back surface of the slidable template;
      an image sensor for receiving speckle images formed by light beams scattered by the back surface; and
      an image processor for obtaining relative location, moving direction and speed of the slidable template by comparison of the speckle images; and
   a control unit for controlling corresponding movement of the cursor of the digital apparatus according to the relative location, moving direction and speed obtained from the image processor.

2. The movable touchpad according to claim 1, wherein the limiting member has an opening around central portion of the back surface of the slidable template for exposing the back surface to be illuminated by the light beams from the light source.

3. The movable touchpad according to claim 1, wherein the optical displacement detecting device further comprises a lens for converting the light beams emitted from the light source into parallel light beams to illuminate the back surface of the slidable template.

4. The movable touchpad according to claim 1, wherein the optical displacement detecting device further comprises an imaging module for receiving the scattered light beams and generating diffractive light beams.

5. The movable touchpad according to claim 4, wherein the imaging module comprises an imaging lens and an aperture.

6. The movable touchpad according to claim 1, further comprising a capacitive touch switch located on the slidable template for providing the slidable template with touch functions.

7. The movable touchpad according to claim 6, wherein the touch functions comprise single click, double click, drag and scroll.

8. The movable touchpad according to claim 1, further comprising a resistive touch switch located on the slidable template for providing the slidable template with touch functions.

9. The movable touchpad according to claim 8, wherein the touch functions comprise single click, double click, drag and scroll.

10. The movable touchpad according to claim 1, wherein the front and back surfaces of the slidable template are form of an identical material.

11. The movable touchpad according to claim 1, wherein the front and back surfaces of the slidable template are form of different rigid materials.

12. The movable touchpad according to claim 1, wherein the slidable template is made of aluminum.

13. The movable touchpad according to claim 1, wherein the front and back surfaces of the slidable template have different surface characteristics.

14. The movable touchpad according to claim 13, wherein the surface characteristics comprise roughness and texture.

15. The movable touchpad according to claim 1, further comprising a edge detecting device, provided at four sides of the limiting member, for detecting whether the slidable template reaches limit of the moving range.

16. The movable touchpad according to claim 15, wherein the edge detecting device comprises a miniaturized touch switch, sensor or button switch.

17. The movable touchpad according to claim 15, wherein the edge detecting device provides a edge contact signal to the image processor for synchronizing the movement of the slidable template and the corresponding movement of the cursor.

18. The movable touchpad according to claim 17, wherein the edge contact signal is a digital pulse.

19. The movable touchpad according to claim 1, wherein the light source is a light emitting diode (LED) or laser diode (LD).

20. The movable touchpad according to claim 1, wherein the image processor is a central processing unit (CPU), field programmable gate array (FPGA), digital signal processor (DSP) or application-specific integrated circuit (ASIC).

* * * * *